Figure 1:
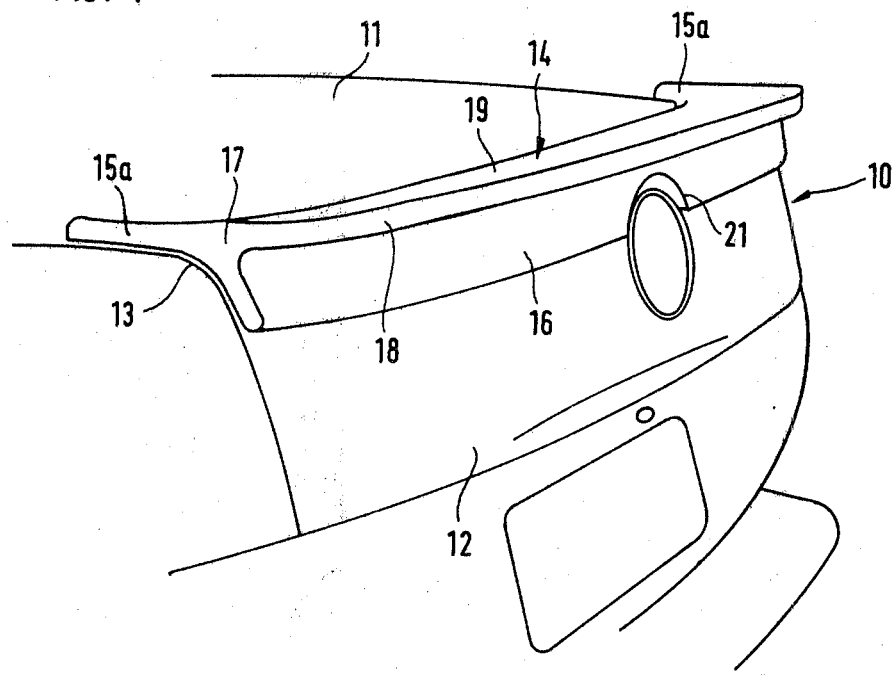

United States Patent [19]

Koch

[11] 4,417,760
[45] Nov. 29, 1983

[54] TAIL SPOILER FOR MOTOR VEHICLES, IN PARTICULAR FOR PASSENGER CARS WITH A TAIL TRUNK SPACE

[75] Inventor: Adolf Koch, Waiblingen-Neustadt, Fed. Rep. of Germany

[73] Assignee: Autohaus Lorinser GmbH & Co., Waiblingen, Fed. Rep. of Germany

[21] Appl. No.: 294,170

[22] Filed: Aug. 19, 1981

[30] Foreign Application Priority Data

Jan. 16, 1981 [DE] Fed. Rep. of Germany ........ MR848
May 21, 1981 [DE] Fed. Rep. of Germany ....... 8115138

[51] Int. Cl.³ ............................................. B62D 35/00
[52] U.S. Cl. ...................................... 296/1 S; 296/76
[58] Field of Search ........................... 296/1 S, 56, 76; 180/903

[56] References Cited

U.S. PATENT DOCUMENTS 4,159,843 7/1979 Crossman ............................. 296/1S
4,274,670 6/1981 Pitzmann ............................. 296/1 S
4,323,274 4/1982 Söderberg et al. ................... 296/76

FOREIGN PATENT DOCUMENTS 2555006 6/1977 Fed. Rep. of Germany ...... 296/1 S

OTHER PUBLICATIONS

J. C. Whitney & Co. catalog, pp. 98, 99 and 63 published 1979.
Hot Rod Magazine, Instant Spoiler article, p. 54, published Apr. 1967.

Primary Examiner—Joseph F. Peters, Jr.
Assistant Examiner—Ross Weaver
Attorney, Agent, or Firm—Michael J. Striker

[57] ABSTRACT

A tail spoiler for motor vehicles provided with a tail trunk section having an upper outer face, a rear outer face and a transition region is proposed. The tail spoiler includes a center portion which is arranged along the transition region and extends along the width of the tail trunk portion, and further an air deflection part connected to the center portion in a rearward and upward direction therefrom and an angular mounting part. The angular mounting part which is also connected to the center portion has at least two shank arms spaced from each other along the width of the motor vehicle. These two shank arms are located on the upper outer face in forward direction. In addition, the mounting part includes two further shank arms which are also spaced from each other along the width of the motor vehicle but are located on the rear outer face in a downward direction and are arranged at an angle less than 180° relative to the first mentioned shank arms.

7 Claims, 8 Drawing Figures

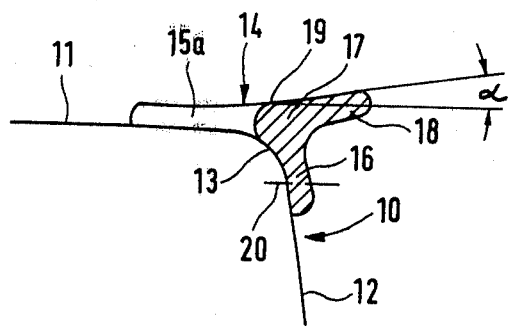
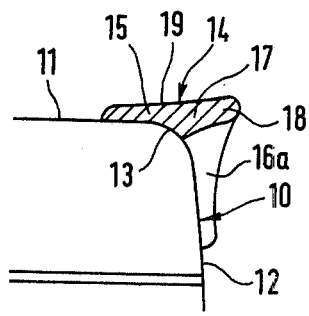
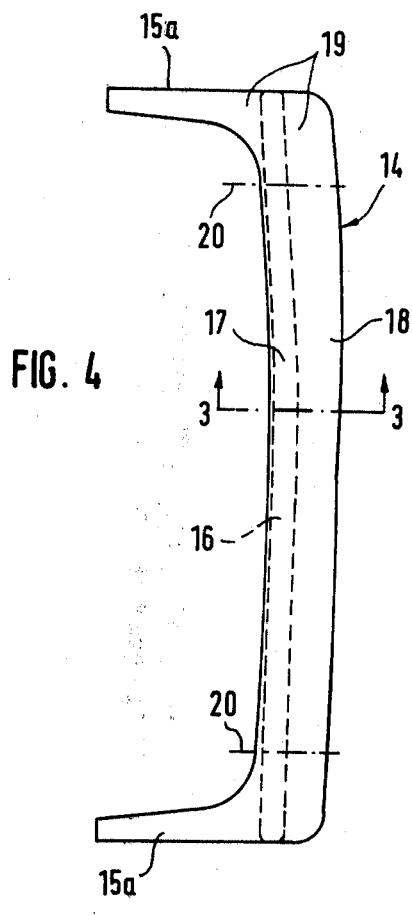
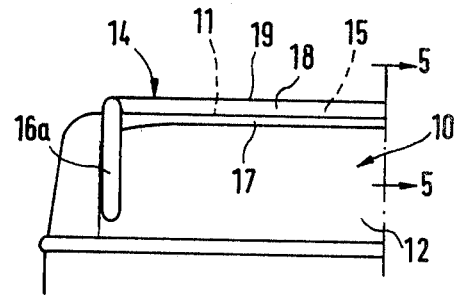
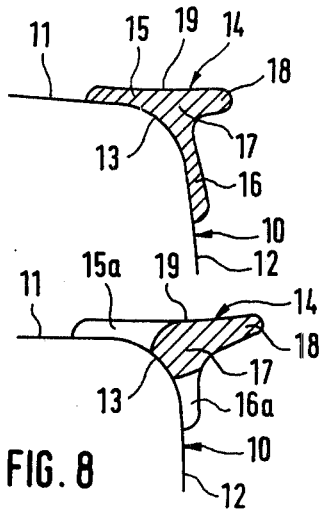

TAIL SPOILER FOR MOTOR VEHICLES, IN PARTICULAR FOR PASSENGER CARS WITH A TAIL TRUNK SPACE

DESCRIPTION

The invention relates to a tail spoiler for motor vehicles, in particular with a tail trunk space, for example, also a similar attached like chassis tail portion. Eddy currents are generated behind such a tail section which increase the air resistance of the driving vehicle and thereby substantially increase the fuel consumption. Furthermore, the driving safety is impaired by the eddy current.

It is therefore an object of the invention to substantially lower the air resistance of the vehicle. Also, the driving safety should be increased.

Accordingly, the invention consists essentially in that the tail spoiler is disposed on the upper edge (transition region) of the vehicle tail section, whereby this edge is formed in particular by the trunk space hood and is provided with a rearwardly upwardly directed upper air guide face in the longitudinal direction of the vehicle.

With the invention it is achieved that, on the one hand, the air resistancy is reduced due to a flow improved air guidance and/or, on the other hand, that the hitherto reduced road traction of the vehicle, which is caused by the eddy current, is increased due to the downward pressure of the air which flows over the tail spoiler.

In accordance with a further embodiment of the invention the tail spoiler which is disposed on the upper edge (transition region) of the vehicle tail section is provided with a rearwardly directed air guidance face and with an angular mounting part with a shank portion engaging the upper outer face of the vehicle tail section in a forward direction, and on the rearward downwardly extending outer face a shank portion engaging the upper outer face of the vehicle tail section in a downward direction. Such a design of the tail spoiler which is also advantageous independent from the direction and angular position of the rearwardly directed air guidance face, that is, when the same is horizontally or downwardly directed, under certain prerequisites, and permits a particularly advantages and very stable mounting of the tail spoiler on the chassis.

Figure 2:
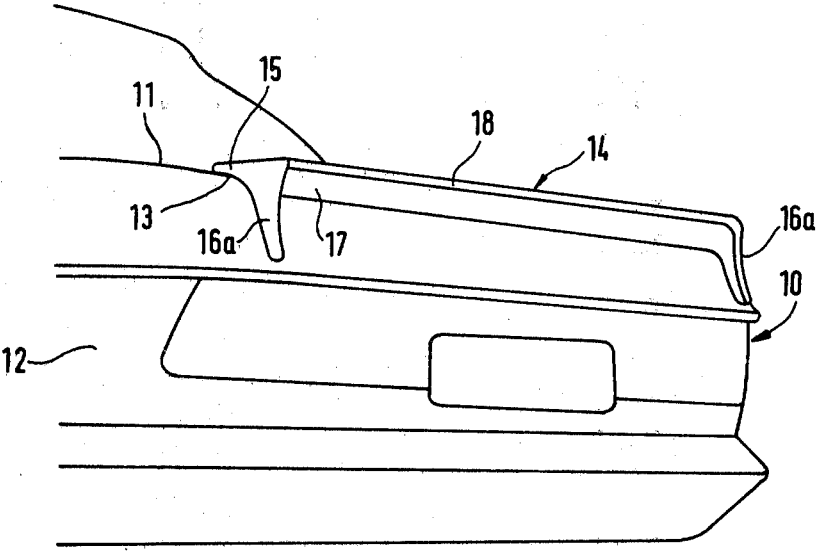

The drawings show exemplified embodiments of the invention. The drawings show:

FIG. 1 the perspective view of a first embodiment of an inventive tail spoiler,

FIG. 2 the perspective view of a second embodiment of a tail spoiler in accordance with the invention.

FIG. 3 a cross section through a tail spoiler in accordance with claim 1 and in a section in accordance with line 3—3 of FIG. 4, FIG. 4 a plan view of FIG. 3

FIG. 5 a cross section corresponding to FIG. 3 through the second embodiment in accordance with FIG. 2 and in accordance with line 5—5 of FIG. 6, FIG. 6 a view of this further embodiment from the rear, FIGS. 7 and 8 cross sections through two further embodiments of the invention corresponding to FIGS. 3 and 5.

The tail spoiler 14 is mounted on the trunk space hood 10 of the motor vehicle (or on a corresponding vehicle tail portion) with the upper outer face 11 and the rear outer face 12 which blend into each other by a curved transition region 13.

The tail spoiler 14 which essentially extends in transverse direction of the vehicle moving direction across the tail section or the trunk space hood of the vehicle is provided with a star-like design in the side view with angular mounting parts formed by the shank portions 15,16 and center portion 17 and rearwardly directed air deflection part 18. The air deflection part 18 extends essentially as a continuation of the forwardly directed shank portion 15 and is provided with an upper air guidance face 19 which is directed in an angle α, preferably less than 10° upwardly to the rear with respect to the horizontal, when the spoiler is mounted on the vehicle.

In the shown exemplified embodiments the air guidance face 19 extends over the air deflection part 18 and in addition over the forwardly directed shank portion 15, so that the spoiler 14 is limited continuously on its upper side by the air guidance face 19.

On its lower side, the shank portions 15,16 are fitted, preferably continuously to the curved chassis surface 11-13-12, so that the tail spoiler 14 snugly engages the surface. The shank portions extend either continuously transverse over the tail spoiler, or are merely formed by lateral shank arms.

In the embodiments of FIGS. 3 and 4, the forward directed shank portion merely consists of the two lateral arms 15a, which the downwardly directed shank portion 16 extends over the total width of the tail spoiler. If need be, the lateral shank arms 15a may be designed independent from the air guide face 19.

For mounting the tail spoiler on the chassis or on the trunk space hood, a plurality of screws 20 are used, for example, which connect the downwardly directed shank portion 16 with the chassis part 10. However, with a corresponding design of the lateral shank arms 15, they may be used alone or additionally in mounting the tail spoiler 14 on chassis part 10.

In the embodiments of FIGS. 5 and 6, the forward directed shank portion 15 is continuously designed, in contrast to the downwardly directed shank portion 16 which consists of two lateral shank arms 16a.

In the embodiment of FIG. 7, it is assumed that both shank portions 15 and 16 extend continuously transverse the tail spoiler 14, which in the embodiment shown in FIG. 8, it is assumed that both shank portions are formed by two lateral shank arms 15a and 16a.

FIG. 1 also shows a recess 21 in shank portion 16, for example, for receiving a company name, or the like.

The invention is not limited to the shown embodiments. For example, instead of two shank arms, three or more shank arms may be provided with one or a plurality of center shank arms 15a or 16a. Also, the tail spoiler may be stationary mounted to the chassis or the trunk space hood, instead of being detachably mounted. The shank portion 15, or both shank portions 15,16, or the center part 17 may be used for mounting.

I claim:

1. A tail spoiler for motor vehicles, in particular for passenger cars including a tail trunk section provided with an upper outer face, a rear outer face downwardly extending therefrom, and a transition region connected to the upper outer face and to the rear outer face, the tail spoiler comprising a center portion arranged along the transition region and extending along the width of the tail trunk portion; an air deflection part connected to and extending rearwardly and upwardly from the center portion, so as to form an upper air guide face which is directed rearwardly and upwardly in longitudinal direction of the motor vehicle; and an angular mounting part connected to the center portion, the angular mounting part having at least two shank arms spaced from each other along the width of the motor vehicle and being located on the upper outer face in forward direction, and at least two further shank arms spaced from each other along the width of the motor vehicle and located on the rear outer face in a downward direction, at an angle less than 180° relative to said first mentioned shank arms.

2. A tail spoiler as defined in claim 1, wherein the shank arms located on the upper outer face are connected to each other so as to form a first integral shank portion along the width of the motor vehicle.

3. A tail spoiler as defined in claim 1, wherein the further shank arms located on the rear outer face are connected to each other so as to form a second integral shank portion along the width of the motor vehicle.

4. A tail spoiler as defined in claim 1, wherein the upper guide face is directed rearwardly in an upward direction at an angle of less than 10°.

5. A tail spoiler as defined in claim 1, wherein the mounting part has an underside and wherein the tail trunk portion has a curved contour at the transition part, the underside being matched to the curved contour of the tail trunk section.

6. A tail spoiler as defined in claim 1, wherein the angular mounting part is detachably mounted to the tail trunk section.

7. A tail spoiler as defined in claim 6, wherein the angular mounting part is detachably mounted to the tail trunk section by means of screws.

* * * * *